US011411855B1

(12) United States Patent
Flamini et al.

(10) Patent No.: US 11,411,855 B1
(45) Date of Patent: Aug. 9, 2022

(54) COMPUTATION OF RANKED PATH OPTIONS IN NETWORKS

(71) Applicant: Amazon Technologies, Inc., Seattle, WA (US)

(72) Inventors: David Alonso Flamini, Dublin (IE); Orlando Maldonado, Seattle, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/917,681

(22) Filed: Jun. 30, 2020

(51) Int. Cl.
*H04L 45/122* (2022.01)
*H04L 45/42* (2022.01)
*H04L 45/128* (2022.01)
*H04L 45/02* (2022.01)
*H04L 43/0852* (2022.01)
*H04L 41/0816* (2022.01)
*H04L 45/24* (2022.01)

(52) U.S. Cl.
CPC ........ *H04L 45/122* (2013.01); *H04L 41/0816* (2013.01); *H04L 43/0852* (2013.01); *H04L 45/02* (2013.01); *H04L 45/128* (2013.01); *H04L 45/245* (2013.01); *H04L 45/42* (2013.01)

(58) Field of Classification Search
None
See application file for complete search history.

(56) References Cited

U.S. PATENT DOCUMENTS

| 2005/0073958 | A1* | 4/2005 | Atlas | H04L 45/22 370/238 |
| 2011/0060844 | A1* | 3/2011 | Allan | H04L 45/66 709/241 |
| 2012/0275787 | A1* | 11/2012 | Xiong | H04L 47/6295 398/45 |
| 2013/0308444 | A1* | 11/2013 | Sem-Jacobsen | H04L 45/02 370/230 |
| 2015/0131997 | A1* | 5/2015 | Syed | H04Q 11/0066 398/69 |
| 2017/0012827 | A1* | 1/2017 | Ashwood-Smith | H04L 41/12 |
| 2017/0331722 | A1* | 11/2017 | Greenbaum | H04L 45/12 |

* cited by examiner

*Primary Examiner* — Eunsook Choi
(74) *Attorney, Agent, or Firm* — Klarquist Sparkman, LLP

(57) ABSTRACT

Systems and methods are disclosed for generating synthetic representations of a network and performing path computations using the synthetic representations. A model of the network is created including different representations for different regions of the network based on the network mesh patterns (e.g., a sparse mesh representation, a Clos mesh representation, and a flat mesh representation). The generated representations include synthetic, aggregated nodes and/or links in the represented region that are determined based on different processes according to the type of mesh in the region. Path computations are performed for each representation (e.g., in parallel), then joined to form end-to-end paths between a source and a destination. The computed paths may be used to select a path for routing data through the network.

17 Claims, 10 Drawing Sheets

COMPUTATION OF RANKED PATH OPTIONS IN NETWORKS

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies that control the propagation of data to a destination over a selected path or paths.

Path computation and optimization are important operations for coordinating communications in a network. Network operations and engineering teams use path computation to identify end-to-end paths in networks for facilitating the efficient transmission of data throughout the network. Some networks, such as backbone networks, may include a large number of nodes and links having different parameters. Further, networks are dynamic and as changes are made to the network topology and configuration, either by design or by component or link failure, the paths used between a source and a destination can change. As a result, it can be difficult to perform real-time or near-real-time path computation.

DETAILED DESCRIPTION

Modern high-scale global backbone networks, which may connect a data center to other large networks in other areas (e.g., to other networks/devices distributed around the world), may include a large number of nodes and bidirectional links that are continuously in flux as nodes and links are added, removed, or rearranged. The scaling of such backbone networks may result in a complex topology for the network. However, these networks are typically arranged such that densely connected fabrics sit at the edge of the network, sparsely linked to each other by groups of parallel long-haul edges. Traditional k-shortest paths algorithms (e.g., algorithms that calculate an integer number (k) of shortest paths to a destination node) struggle to keep up with the scale of these topologies, as potentially billions of paths may be found between remote network devices sitting at the edge of the network.

Systems and methods are disclosed that leverage this design pattern in order to optimize end-to-end path computation and scale organically with a network. Although described in reference to a backbone network for illustrative purposes, it is to be understood that the methods and systems described herein may be applicable to other types of networks. The topology pattern of a network may be utilized to create and maintain fresh, summarized views of the network by segmenting the topology into fabrics, collapsing fabrics at the edge and bundling long-haul links. Then, constrained path computation may be performed in parallel on these partial and summarized topologies. The resulting paths can be expanded by constrained combinatory to use real nodes and links, optimizing the path computation process to find a significantly larger number of paths in considerably less time than traditional methods. The system can be partitioned to perform distributed k-shortest path computation at the edge, as the need for k-shortest path computation can be localized to the path head-end nodes sitting within each fabric, allowing for organic scalability. Resulting k-shortest paths can then be stored (cached) and updated as the network changes, invalidating the paths that traverse unavailable, filtered, or otherwise undesired network elements. As the physical network topology design does not change often, especially within fabrics, these cached paths may be computed less frequently, while being immediately available for use. Also, as fabrics are constrained, smaller topologies relative to the full backbone network, they can be modelled offline and real fabric elements associated in the field. K-shortest paths found in different views, and expanded to use real links, can then be easily stitched to build end-to-end paths across the global network by knowing the individual network devices where the head and tail of the individual path segments connect.

Figure 1:
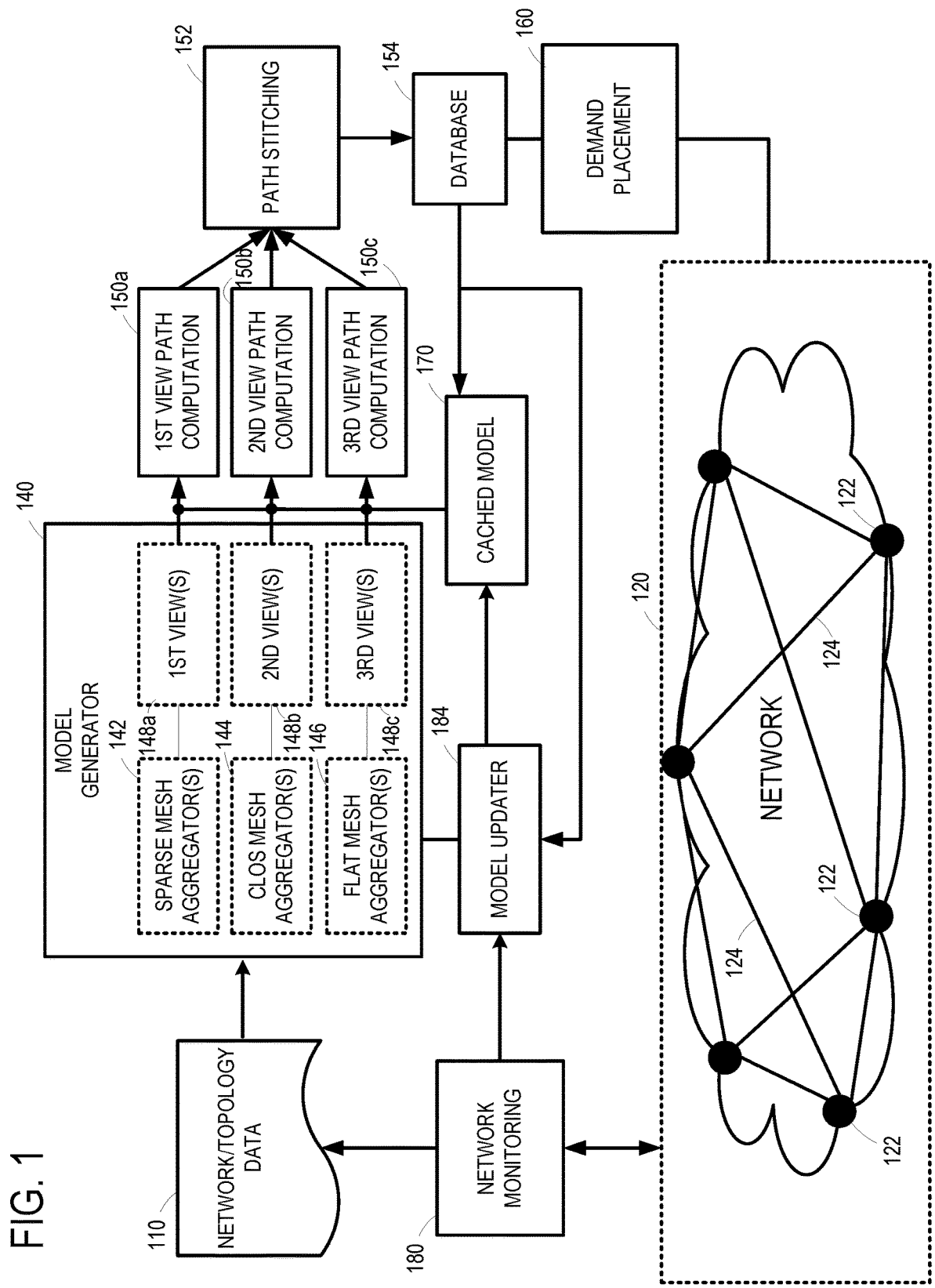
FIG. 1 is an embodiment of a system for performing path computations in a network.

FIG. 1 is an embodiment of a system 100 used to create views of a network (e.g., a backbone network) for use in performing path computation in the network. At 110, network/topology data is received, such as from a database (not shown) and/or from a network monitoring tool 180 performing measurements of the system. The network/topology data may include information that describes the structure of an actual network 120 and/or the configurations that are applied to the network 120. The network 120 includes network devices (nodes), shown generally at 122, and links (e.g., paths), shown generally at 124, between the network devices. Although represented as a few network devices and links, the network 120 generally includes hundreds of thousands of such devices and links. The network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data through the network 120. The links 124 can be any optical, wireless or electrical cables for interconnecting network devices, such as Ethernet cables, or wireless connections.

The network/topology data 110 can include physical or logical structural information for the network. Example physical structural information can include network device types, link distances, link types, geographic locations, signal types, transmission rates, etc. The logical structural information describes how data flows through the network 120. For example, the network/topology data may include operating parameters/status of the links and nodes, including latency, capacity, error/dropped packet rates, and other parameters. Example configurations of the network that may be included in the network/topology data 110 include distribution/connectivity of nodes/links, software versions (applications and operating system versions), variables, policies, protocols used, protocol parameters, frequency, speed, interface settings, etc. Thus, the network/topology data 110 can be virtually anything that is changeable remotely on the network devices to configure the network devices and virtually anything that is changeable over time during operation of the network.

A model generator 140 generates a network model periodically or as a result of an event using the network/topology data 110. The model represents the nodes and their interconnecting links in the network, together with their configuration, which may include routing metrics, such that it can be used to determine the paths that will be taken between any network source and destination pair. The model also includes latencies of the links and nodes, so that the latencies of these paths can also be determined. Using the network/topology data 110, the model generator 140 may generate a resultant network model, which includes a model in software and stored data of what the actual network 120 is expected to be. For example, the network model can be a database model, which can be viewed as a graph wherein relationship types are arcs and object types are nodes. The actual network 120 can deviate from the network model due to unexpected updates, interruptions, and failures to network devices or links in the network 120. The network model can be generated periodically (at fixed time intervals), such as once per 30 minutes, once per hour, etc. The network model can also be generated by the model generator based upon an event, such as an update to the network or detected failures in the network.

The model generated by model generator 140 may include multiple sub-models, also referred to herein as views. For example, the model generator may be configured to divide the network into regions and/or otherwise perform processing in consideration of the different regions of the network based on the topology data and generate different views for each region. Each view may correspond to a simplified representation of the region to enable efficient parallel path computations for the network as a whole. For example, the model generator may include one or more sparse mesh aggregators 142 configured to generate one or more respective first views 148a corresponding to sparse mesh regions of the network, one or more Clos mesh aggregators 144 configured to generate one or more respective second views 148b corresponding to Clos-type mesh regions of the network, and one or more flat mesh aggregators 146 configured to generate one or more respective third views 148c corresponding to flat mesh regions of the network.

As will be described in more detail below, the aggregators 142, 144, and 146 may be used to aggregate nodes and links in a given region of the network so that the network may be represented by simplified synthetic nodes/links representing the region. For example, the sparse mesh aggregators 142 may be configured to perform one or more of the following steps on each region of the network that includes a sparse mesh fabric with high edge density between directly connected vertices: (1) remove all tier 2 and above vertices from the Clos fabrics, (2) remove all client device (e.g., tier 0) vertices, and (3) create a view with tier 1 vertices in the Clos fabrics collapsed into a single vertex each; where (4) all Clos fabric-to-Clos fabric edges are collapsed into one or more synthetic edges and connected to collapsed Clos fabric vertices.

The Clos mesh aggregators 144 may be used to aggregate nodes and links in a given region of the network so that the network may be represented by simplified synthetic nodes/links representing the region, for example when computing loop-free paths such that they would always traverse a higher tier in the Clos mesh. In addition, the Clos mesh aggregators 144 may be configured to perform one or more of the following steps on each region of the network that includes Clos mesh fabrics with directly-connected, satellite client device vertices: (1) compute the best path, and cost, between every Clos-fabric and client device vertex; where the output best path(s) have IP interface information embedded, along with total cost; and extract synthetic client device-to-Clos fabric edges from these paths, (2) create a view for each Clos fabric where local and remote client device vertices are directly attached to every tier 1 device by a single edge; and where the client device-to-Clos fabric edges include local and remote IP interface and next-hop information, as well as total cost.

The flat mesh aggregators 146 may be configured to perform one or more of the following steps on each region of the network that includes a flat mesh: (1) remove all tier 2 and above vertices from Clos fabrics, (2) compute the best path, and cost, between every client device vertex, where the output best path have IP interface information embedded, along with total cost, and extract synthetic Clos fabric-to-client device (remote) edges from these paths, (3) create a view for each client device vertex; where the local client device vertex is directly connected to a single, collapsed, Clos fabric vertex, with all its local edges; where all remote client device vertices are singly-connected one hop away through the Clos fabric vertex; and where the Clos fabric-to-client device (remote) edge includes IP interface and next-hop information, as well as total cost. These features are described in more detail below with respect to FIG. 2B.

The output first, second, and third views 148a, 148b, and 148c may be utilized by respective first, second, and third path computation units 150a, 150b, and 150c, respectively to perform on-demand (or scheduled) path computations on the resulting views. It is to be understood that each path computation unit 150a, 150b, and 150c may include multiple computation units enabling parallel processing of multiple views. For example, the path computation units may perform a path computation algorithm that efficiently computes k-shortest paths (e.g., a modified Yen's algorithm) according to one or more parameters and/or business rules (e.g., any combination of desired number of paths, maximum or minimum path length and cost, conditional allow/deny hops, etc.). In this way, path computations may be performed for each view/region of the network independently and in parallel, thereby increasing efficiency of the path computations. The output ranked best path options may have IP interface and next-hop information embedded in the resulting best path, and total cost may be included as well. The total cost may include latency, capacity (e.g., bandwidth), and/or a combination of latency, bandwidth, and/or other parameters. It is to be understood that the computational resources corresponding to the path computation units may also be used by the respective aggregators where path computation is utilized during the creation of the views, as described above with respect to the Clos mesh aggregators 144 and the flat mesh aggregators 146.

The output of the first, second, and third path computation units 150a-150c may be provided to a path stitching unit 152 (e.g., a path joining unit), which is configured to stitch together (e.g., join) the computed best paths for each respective view in order to build corresponding best paths traversing the network as a whole (e.g., between a given source and a given destination). In some examples, the path stitching unit 152 may be configured to provide one or more end-to-end paths that, for each Clos fabric traversed by the end-to-end path, comprise of a respective single path option entering and exiting the Clos fabric (e.g., the flat and sparse mesh regions) and a respective group of path options for the Clos fabric, where the path stitching unit examines aggregated parameters of the group of path options for evaluating the traversal of the Clos fabric in the end-to-end path.

An example process for path stitching may include performing one or more of the following steps. A controller (e.g., any partition of the path stitching unit) may receive a request for a new demand (e.g., a demand for network usage) or to update (e.g., increase/decrease) an existing demand. The partition may decide, based on one or more rules (e.g., predefined rules, such as the prioritization rules described below) if it should start computing the path or if the path is to be computed by a different partition first. If the path is to be computed by a different partition, the request is routed accordingly.

For example, each partition may be associated with a different portion of a network/network model. A first partition to calculate a path between a source and a destination may be determined to be a partition associated with a portion of the network/model in which the source or the destination is located.

In other examples, the partitions may be configured to compute paths in an order that is based on priority. For example, computing paths may be prioritized in a way that demands are better distributed and protected from the backbone view perspective (sparse, inter-site infrastructure), in which case the backbone partition may be configured to compute first. Then the Clos fabric partitions will compute something else and then the client device partitions as well. The order between Clos fabric and client device could be inverted also, based on path placement preferences. A partition could determine to keep the path update to itself if it computes the demand and the result does not change the stitching points. For example, the backbone partition may update the path on the backbone section due to latency changes without requesting Clos fabric or client device partitions to compute their segments as the bandwidth demand did not change. In this example, a number of path options may be pre-computed and stored (cached) independently across views and made available for the path stitching unit 152 which is configured to stitch together the computed best paths for each respective view in order to build corresponding end-to-end paths across the complete topology/network.

One reason for computing multiple candidate options responds to the fact that each partition could compute paths that may be considered equivalent for practical purposes, and that do not match the same entry and exit points as the ones computed by the other partitions. An alternative solution would involve implementing a path negotiation mechanism between partitions that would allow to request a more constrained alternative to an accommodating partition, for example a Clos fabric partition may be the most suitable candidate due to its high density and ideally non-blocking nature. As the Clos fabric view also contains the existing demands between client devices and Clos fabrics, it would also be the candidate partition to compute the highest amount of equivalent performance options to accommodate such demands, and if a path negotiation mechanism is in place, it could also signal the client device partition for alternative options before raising a path computation exception.

The partition that is to start computing the path may start the computation using a corresponding view, and once it generates a resulting path or paths (e.g., a partial path), the partition hands the result over to a next partition. The partial path may include information that allows the next partition to know the stitching point (e.g., identify the node(s) and/or link(s) the path(s) traverse to enter the next partition's view of the network model). The next partition computes its segment of the end-to-end path and determines options that are compatible with the upstream path computation result. If no options are available, an exception may be thrown so that other systems or users may be notified. The partial path computation and handing off may repeat for subsequent partitions until the source and the destination are connected through all partitions and the path options are compatible and comply with defined rules.

As described above, the path stitching unit 152 may be configured to generate one or more best paths for a targeted parameter (or set of parameters) or for each of a plurality of parameters. For example, the path stitching unit may be configured to generate k best paths through the network from a latency perspective (e.g., having the lowest latency), from a capacity perspective (e.g., traversing links having a lowest capacity), and/or from a hybrid perspective (e.g., paths having a lowest latency among paths that are under a threshold capacity level). For example, an initial approach may include computing k-shortest paths up to a threshold number of alternative paths using a single cost variable (e.g., latency or capacity), prune those paths outside of the first variable scope, and then prune all those paths that do not comply with a second constraint. The k best paths may also be computed by providing a maximum path length or a maximum path computation time frame in order to limit the number of paths that are computed. For example, the quantity of paths in a given set of k best paths may be the quantity of shortest paths that are computed within the maximum path computation time frame using a shortest path computation algorithm. As further described above, Shared Risk Ling Group (SRLG)-bound views may be generated in some examples, which splits the k-shortest path problem and reduces the extent of the graph even more. In such examples, resulting paths can be combined to provide an SRLG-bound k-shortest path list. In examples where multiple sets of k best paths are computed, each set may be stored for retrieval by a client or other requesting device.

The output first, second, and third views 148a-148c and/or the associated best path computations (e.g., from the separate path computation units 150a-150c and/or from the path stitching unit 152) may be used by a demand placement unit 160 to update forwarding tables used by one or more routers in the network 120 and/or to otherwise control communication routing through the network 120. For example, the path stitching unit 152 may output its resulting end-to-end paths to a database 154 for storage, and the demand placement unit 160 may query the database 154 to select a best path from the results of the path stitching unit based on one or more parameters (e.g., latency, capacity, etc.). The demand placement unit 160 may then utilize one or more interfaces to program the selected path(s) for controlling communications in the network.

The views 148a-148c and/or the computed paths (e.g., the output from the path computation units 150a-150c and/or the path stitching unit 152, which may be retrieved from the database 154) may be stored as a cached model 170. The cached model 170 may enable later path computations to be performed efficiently by using already-generated views of the network. The cached model may be periodically updated responsive to changes in the network.

As described above, the network monitoring tool 180 may be configured to provide information regarding the network 120 to other components for monitoring network health, maintaining cached data on the network, and performing path computations for the network. For these purposes, the network monitoring tool 180 can determine actual latency, capacity, and other operating parameters of the network 120. For example, the network monitoring tool 180 can inject packets into the network 120 and determine an amount of time for the packets to traverse the network. Time stamps can be used at the source and destination nodes to determine the amount of traversal time. The network monitoring tool 180 may also request information from the network and/or the nodes of the network to determine the operating parameters. The output of the network monitoring tool may include measured (or received) data. The measured data may be provided (e.g., in the form of network/topology data 110) to the model generator 140 to be used to perform the operations described above, and may also be provided to a model updater 184, which is configured to trigger the model generator to perform updated aggregations and view generations, and to update the cached model 170 based on the changes to the network as identified by the network monitoring tool 180. The model updater 184 may also retrieve data from the database 154 for use in updating the cached model 170. For example, the model updater 184 may utilize a selected aggregator to generate an updated view for a region of the network that has changed since a last update of the model (e.g., the selected aggregator may be the aggregator that corresponds to the type of network region that has experienced the change). Changes in the network that may trigger an update of the model may be an addition, removal, or movement of a node or link in the network, a change in configuration of a node or link in the network, and/or a change in operating status of a node or link in the network. In some examples, the cached model may be updated responsive to a threshold number of changes and/or a threshold amount of a change being detected by the network monitoring tool 180. In still other examples, the cached model may be updated responsive to a user or client request and/or according to a scheduled timing (e.g., configurable by a user or client).

Figure 2A:
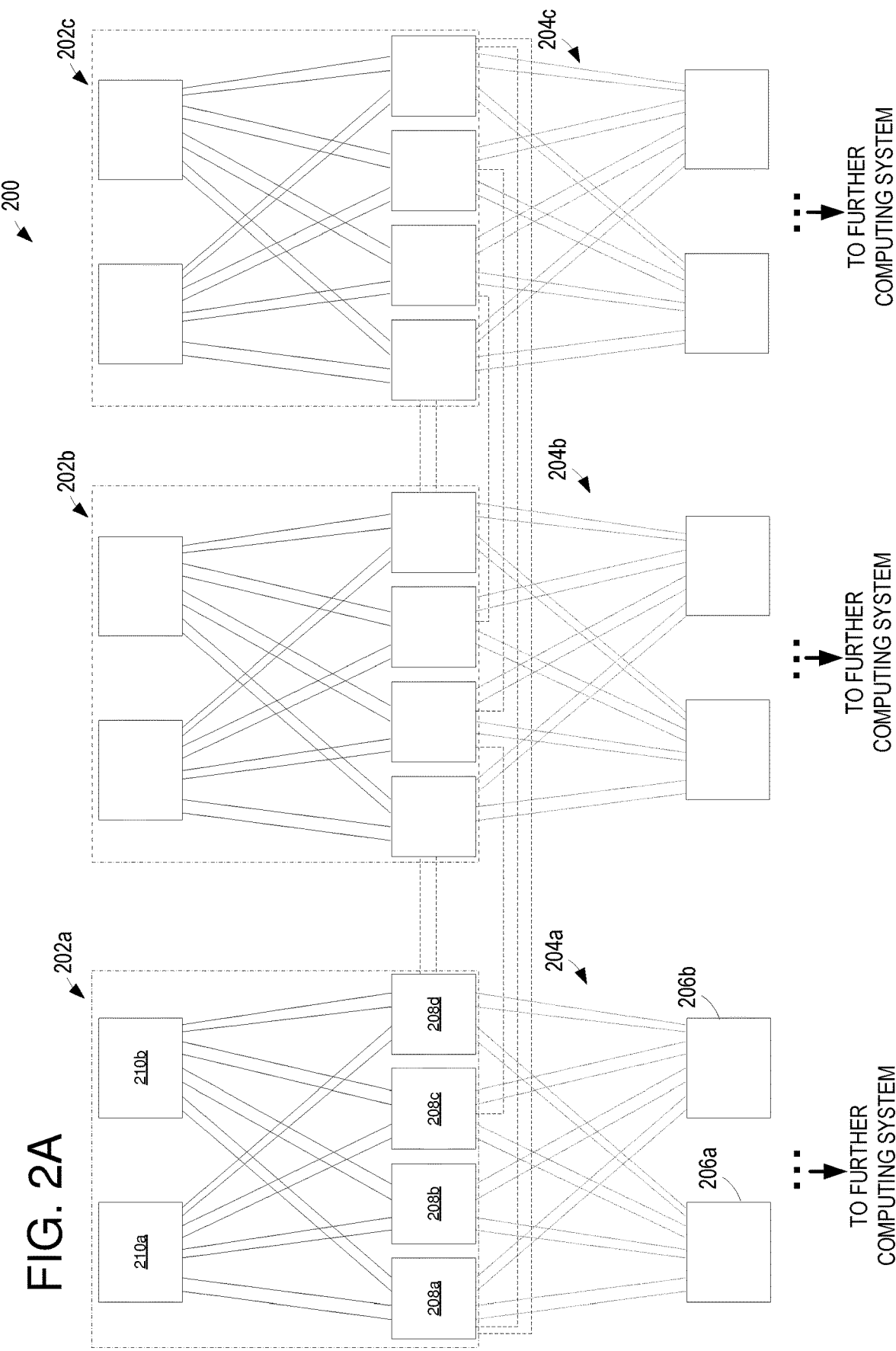
FIG. 2A is an embodiment of a multi-layered network.

FIG. 2A is an example network 200 having a layered topology that includes Clos fabrics 202a, 202b, and 202c and flat mesh areas 204a, 204b, and 204c, with sparse links connecting the Clos fabrics to one another. It is to be understood that the arrangement shown in FIG. 2A is provided for illustrative purposes and a variety of network structures can be used, such as a spine-leaf network topology or network structures having an intermediate aggregation layer. Further, the Clos fabrics may include two-tier Clos, three-tier Clos, etc.

In this embodiment, the flat mesh areas 204a, 204b, and 204c include client devices (e.g., tier 0 devices, examples of which are shown at 206a and 206b) that are connected (e.g., directly or via one or more intermediate devices) to a further computing system, such as a data center. The Clos fabrics may include edge devices for entering and exiting the Clos fabric. For example, Clos fabric 202a includes inner, flat mesh-facing edge devices 208a-208d and outer edge devices 210a and 210b. The client devices of the flat mesh areas are connected to the inner edge devices of a respective Clos fabric via communication links forming a flat mesh, represented by dotted lines in FIG. 2A. For each Clos fabric, the inner and outer edge devices for that Clos fabric are connected to one another via a dense mesh of communication links, represented by solid lines in FIG. 2A (e.g., each solid line may represent one or more groups of opposing unidirectional links). At least some of the inner edge devices of the different Clos fabrics are connected to one another via communication links forming a sparse mesh, represented by the dashed lines in FIG. 2A.

In the example shown in FIG. 2A, the spans between the Clos fabrics may be respectively grouped as having respective similar parameters. For example, each group of links may be identified as a shared risk link group. For each group, the links in the group may be aggregated to a single synthetic link that represents all links in the group with respect to link parameters such as capacity and/or latency. In this way, the sparsely-connected regions of the network may be represented in a simplified model topology for ease of path computation. For example, FIG. 2A shows an example simplified view 200' of the sparse mesh region of the network (e.g., representing the backbone network as a whole). In the view 200', the network is collapsed to show only the Clos fabrics, each represented as a single device or node. For example, Fabric 1 may correspond to the Clos fabric 202a of FIG. 2A, Fabric 2 may correspond to the Clos fabric 202b, and Fabric 3 may correspond to the Clos fabric 202c. Each of the fabrics are coupled to one another by a respective synthetic link corresponding to an aggregation of the associated physical links between the Clos fabrics.

For dense portions of the network (e.g., the Clos fabric formed by the Clos-type networks, such as Clos fabrics 204a-204c), a single view may be created for each Clos fabric in the network when generating the simplified model topology. For example, in the view 202a' of FIG. 2B, the Clos fabric 202a of FIG. 2A is simplified by collapsing all of the links between the edge devices to form respective synthetic links (e.g., one synthetic link between each inner edge device and each outer edge device, corresponding to the aggregation of the physical links between those respective edge devices).

For flat mesh portions of the network (e.g., the flat mesh areas 204a-204c in FIG. 2A), a single view may be created for each flat mesh region when generating the simplified model topology. For example, in the view 204a' of FIG. 2B, the flat mesh area 204a of FIG. 2A is simplified by collapsing the inner edge nodes of the Clos fabric 204a to a single representative node ("Fabric 1" in FIG. 2B) and providing synthetic links between the client devices and the Clos fabric. For example, the number of synthetic links between a given client device and the Clos fabric may be equal to the number of edge devices of the Clos fabric to which the client device is connected. In the illustrated example, each client device 206a and 206b is connected to four edge devices, so four synthetic links are provided in the view 204a'.

Figure 2B:
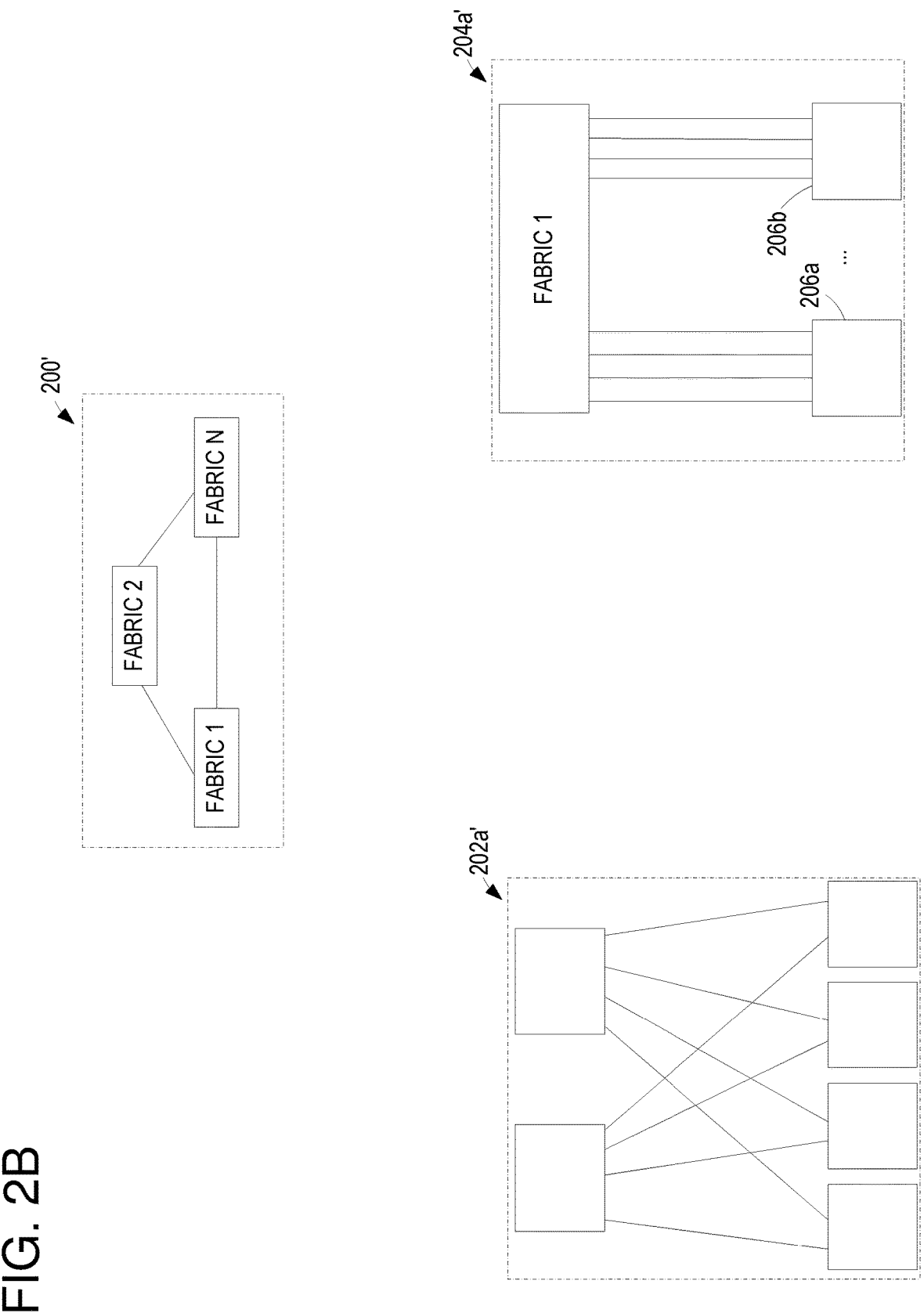
FIG. 2B is an embodiment of synthetic views of different portions of the multi-layered network of FIG. 2A.
Figure 2C:
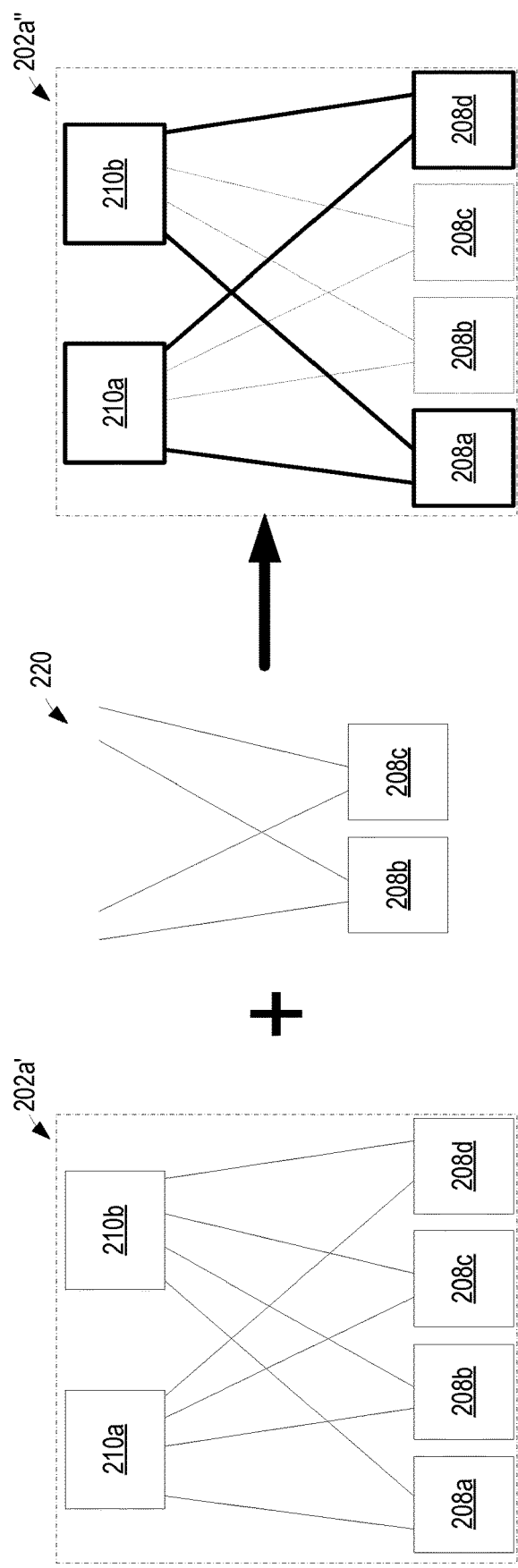
FIG. 2C shows an example process for computing paths between selected devices of the multi-layered network of FIG. 2A using the synthetic views of FIG. 2B.

FIG. 2C shows an example for using the simplified views of FIG. 2B to determine shortest paths between a source and a destination within a Clos fabric. In the illustrated example, the simplified view 202a' is used to evaluate paths between devices 208*a* and 208*d* through the Clos fabric 202*a* (shown in FIG. 2A). Since the shortest paths through the Clos fabric will not involve the other inner edge devices 208*b* and 208*c*, the communication paths involving devices 208*b* and 208*c* can be removed from the view by applying a mask 220 (which includes the devices 208*b* and 208*c* and associated communication links) to form resulting masked view 202*a*". In the masked view 202*a*", the bolded paths may be provided as options through the Clos fabric between devices 208*a* and 208*d*.

Once paths are computed as described above using the simplified views that include synthetic links and/or nodes, corresponding physical paths may be identified by expanding the synthetic links and nodes using the aggregated information associated with the synthetic components. For example, when the aggregated synthetic links are generated, a respective pointer is created and associated with each of the synthetic links, which points to a list or other data structure that includes information and/or identification of the physical links represented by that corresponding synthetic link.

In order to find combinations of links to build paths through a given view, real links are selected for use in a path according to a pattern that provides a balanced number of repeated link entries in the resulting expanded paths in order to control how long it takes to produce a group of combinations and to find the right combinations to minimize polarization. For example, if a real link appears twice in a result, the expansion process is controlled to aim for other links in the group to appear twice until reaching a desired maximum number of paths. In this way, while there still may be some polarization (e.g., some links appear twice while other links appear three times), the polarization is minimized while still reducing overall combination computations. This allows for the balancing of demand placement (e.g., actual traffic) while minimizing polarization on a subset of links and reducing the radius of failures in the network. The desired maximum number of paths may be selected by a user based on known network parameters and/or may be set as a function of a network parameter, such as network size.

In this embodiment, a centralized controller (e.g., a network monitoring device, such as network monitoring tool 180 of FIG. 1) may be coupled to the network 200. The centralized controller may execute on a server computer and provide a mechanism for measuring link and node characteristics in the network, such as latency, capacity, and/or other parameters of the links and/or nodes to assist with generating the views shown in FIG. 2A. For example, to determine latency parameters, the centralized controller may transmit packets through the network and receive latency information from endpoints or from intermediate nodes. The latency information can include time stamps indicating when the packet was received and/or transmitted together with an identifier of the packet. Using the received information, the centralized controller can determine actual latency of the network packets as they traverse the network. Similar mechanisms may be used to determine capacity and other information regarding the links and nodes in the network. In other examples, the centralized controller may query one or more nodes for the link and node characteristics. It should be recognized that the centralized controller described in all embodiments herein can be a distributed computing environment having multiple server computers.

Using the link and node characteristics, the centralized controller may build and maintain a model of the network (e.g., having the simplified model topology described above) and use the model to perform path computations and optimization for the network, as will be described in more detail below with respect to the disclosed methods. For example, the centralized controller may use the model to compute the k best paths to one or more destinations in the network according to at least one of the link and node characteristics. Other example path computations are described below in more detail.

Figure 3:
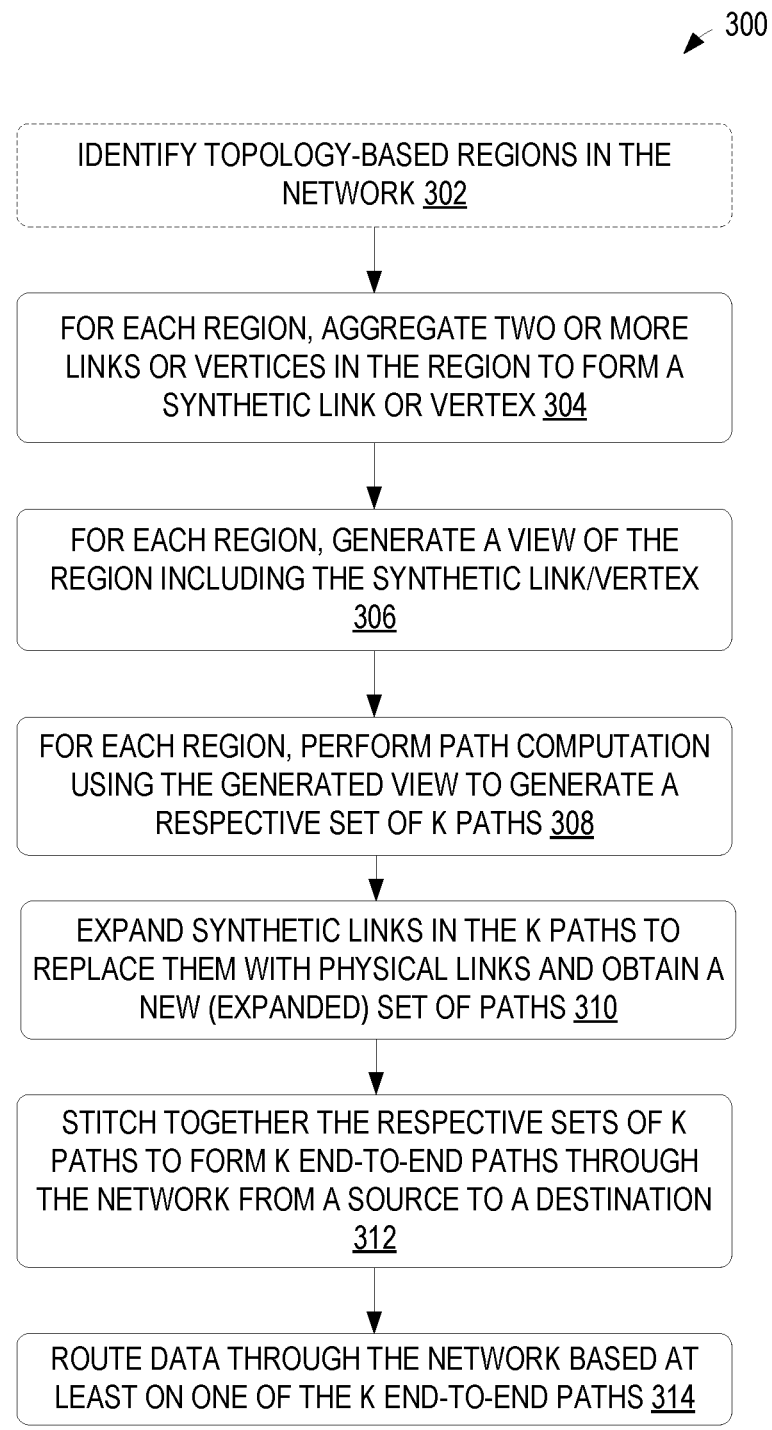
FIG. 3 is a flow chart of an example method of performing path computations in a network using generated views of different regions of the network.

FIG. 3 is a flow chart of an example method 300 of performing path computations in a network using generated views of different regions of the network. For example, method 300 may be performed to provide path computations for a network such as network 120 of FIG. 1 and/or network 200 of FIG. 2A. The method may be performed by a centralized controller, such as the network monitoring tool 180 of FIG. 1 and/or one or more associated modules (e.g., the model generator 140, path computation 150*a*-150*c*, and path stitching 152 modules of FIG. 1). At 302, the method optionally includes identifying topology-based regions in the network. In some examples, such regions may be directly indicated in network information received from the network, while in other examples, the parsing of the network into different regions may be performed by the controller by evaluating topology data received from the network. For example, the topology data may indicate the structure of the network, including interconnections between devices, and the controller may identify different regions in the network based on the meshes formed by the interconnections.

At 304, the method includes, for each region, aggregating two or more links or vertices in the region to form a single synthetic link or vertex representing those links/vertices. It is to be understood that one or more of the regions may include multiple groups of links or vertices that may be respectively aggregated to form corresponding single synthetic links or vertices. The synthetic link or vertex may have one or more property values (e.g., latency, capacity, and/or other parameter value) corresponding to respective aggregated property values of the two or more links or vertices used to form the synthetic link or vertex.

At 306, the method includes, for each region, generating a view (e.g., a representation, such as a graphical representation, a schematic representation, a visual representation, and/or any other representation that is able to be used by a path computation unit to, for example, compute paths through at least a portion of the network) of the region including the synthetic link/vertex. In examples where multiple groups of links or vertices are aggregated, the generated view for the corresponding region may include multiple synthetic links and/or vertices corresponding to these aggregated elements. It is to be understood that in some examples, there may one or more regions of the network that have only one link between vertices and/or otherwise do not have elements that are able to be aggregated. In such examples, a view may still be created for those regions, having at least some synthetic links that correspond to the physical links in a one-to-one ratio.

At 308, the method includes, for each region, performing path computation using the generated view to generate a respect set of k paths. In some examples, multiple sets of k paths may be computed for a generated view, with each set corresponding to k best paths in terms of a different selected parameter or combination of parameters. The k paths may be computed by evaluating the one or more property values (e.g., the total cost) of the synthetic links/vertices in accordance with a selected best paths algorithm, as described above with respect to FIG. 1. The computation of paths using the synthetic links/vertices increases the efficiency of calculations since fewer total links/vertices are evaluated. It is to be understood that the path computation for each region may be done in parallel, thereby further increasing efficiency of the path computations relative to other mechanisms that are not capable of evaluating multiple regions of a network in parallel.

At 310, the method includes expanding the synthetic links in the k paths to replace the synthetic links with corresponding physical links. For example, as described above, the synthetic links may include one or more respective pointers to one or more respective databases, which identify physical links corresponding to the synthetic links. As a result of the expansion, a new (expanded) set of paths are obtained, corresponding to the physical links.

At 312, the method includes stitching together (e.g., joining) the respective sets of k paths (e.g., the expanded set of paths obtained at 310) to form k end-to-end paths through the network from a source to a destination. At 314, the method includes routing data through the network based at least on one of the k end-to-end paths. For example, a request to send data from the source to destination may also include constraints for capacity/bandwidth and/or latency, and an end-to-end path may be selected to send the data through the network based on the k best path (e.g., a shortest path) that satisfies the capacity/bandwidth and/or latency constraints.

Figure 4:
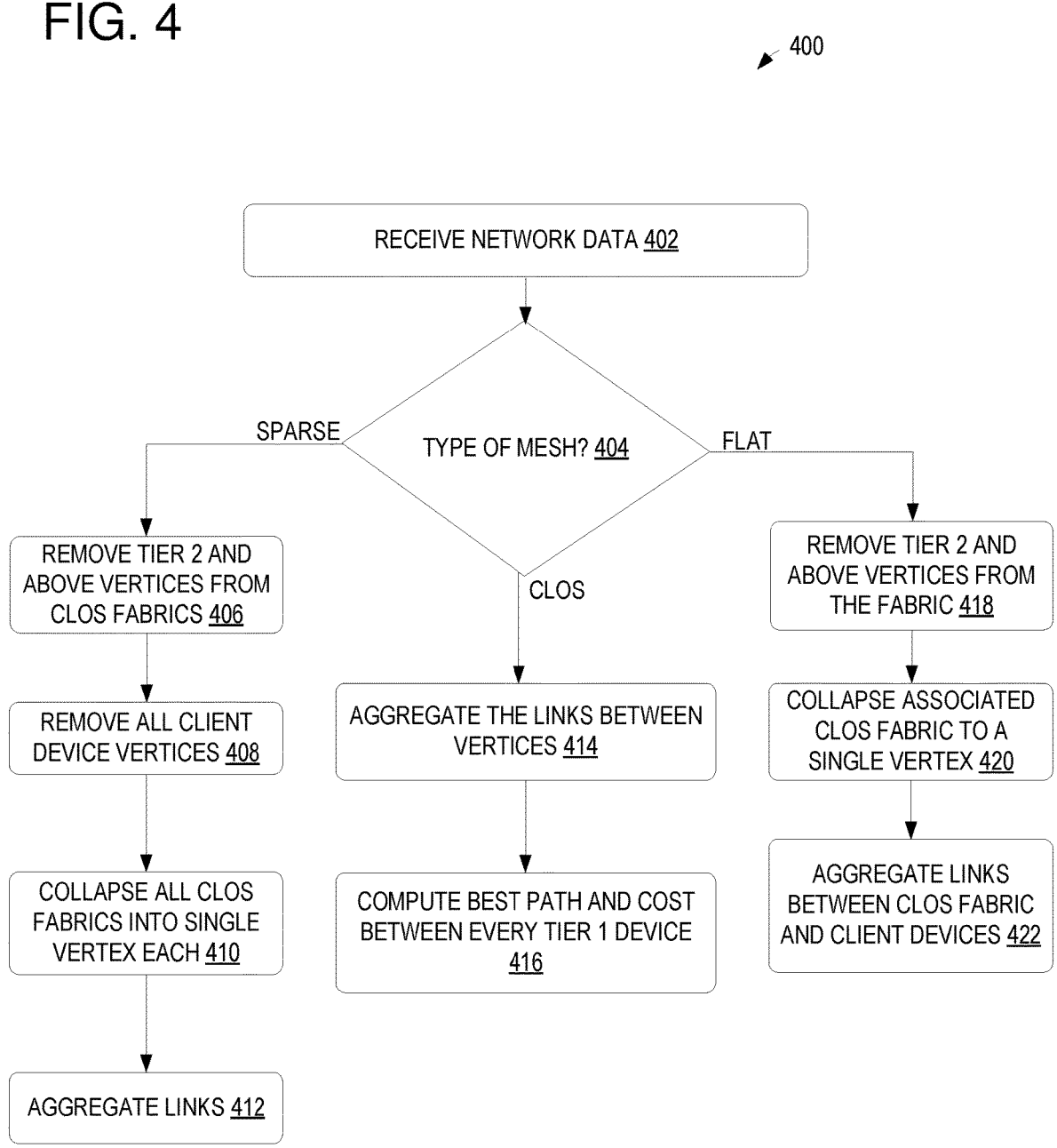
FIG. 4 is a flow chart of an example method of generating views of different regions of a network for use in performing path computations.

FIG. 4 is a flow chart of an example method 400 of generating views of different regions of a network for use in performing path computations. For example, method 300 may be performed to provide path computations for a network such as network 120 of FIG. 1 and/or network 200 of FIG. 2A. The method may be performed by a centralized controller, such as the network monitoring tool 180 of FIG. 1 and/or one or more associated modules (e.g., the model generator 140 of FIG. 1). At 402, the method includes receiving network data. For example, the network data may indicate the structure of the network and/or other topology information, as well as characteristics of network devices and/or links on the network.

At 404, the method includes determining the type of mesh for the region of network for which a view is being created. For sparse mesh regions, the method includes, at 406, removing tier 2 and above vertices from Clos fabrics in the network. The method further includes, at 408, removing all client vertices and, at 410, collapsing all Clos fabrics into a single vertex each. At 412, the method includes aggregating the links between the Clos fabrics. For example, as shown in FIG. 2B, sparse links between Clos fabrics in the network may be aggregated to a corresponding synthetic link (e.g., a single synthetic link) between each of the Clos fabrics (which are respectively represented by a corresponding synthetic vertex). The aggregated links may include information indicating a total cost and/or other parameters corresponding to an aggregation of the individual links being represented by the respective aggregated links.

For Clos mesh regions, the method includes, at 414, aggregating the links between vertices in each Clos fabric. For example, as shown in FIGS. 2A and 2B, the links between the edge devices in the Clos fabric 204a are aggregated to form one synthetic link for each tier 1 device connection. At 416, the method includes computing a best path(s) and associated cost between every tier 1 device (e.g., the edge devices of the Clos regions in FIG. 2B).

For flat mesh regions, the method includes, at 418, removing tier 2 and above vertices from the fabric. At 420, the method includes collapsing an associated Clos fabric to which the flat mesh region is connected into a single vertex. For example, as shown in FIG. 2B, the Clos fabric 204a is collapsed to a single representative vertex in the flat mesh view 204a'. At 422, the method includes aggregating links between the Clos fabric and the client devices to generate corresponding synthetic links. As shown in FIG. 2B, each synthetic link may correspond to an aggregation of physical links that are between the client device and a given one of the edge devices of the Clos fabric before the collapsing performed at 418.

The performance of method 400 may result in the generation of at least three views representing a single network, each view representing a different area of the network with a different type of topology. The generation of these views greatly simplifies areas of the network by effectively reducing the number of links and vertices used in path computations (e.g., due to the use of representative aggregates of multiple links and vertices). The generation of these views further allows for the simultaneous and/or otherwise independent computation of best paths for each region, which thereby further increases the efficiency of calculating overall end-to-end best paths through the network.

Figure 5:
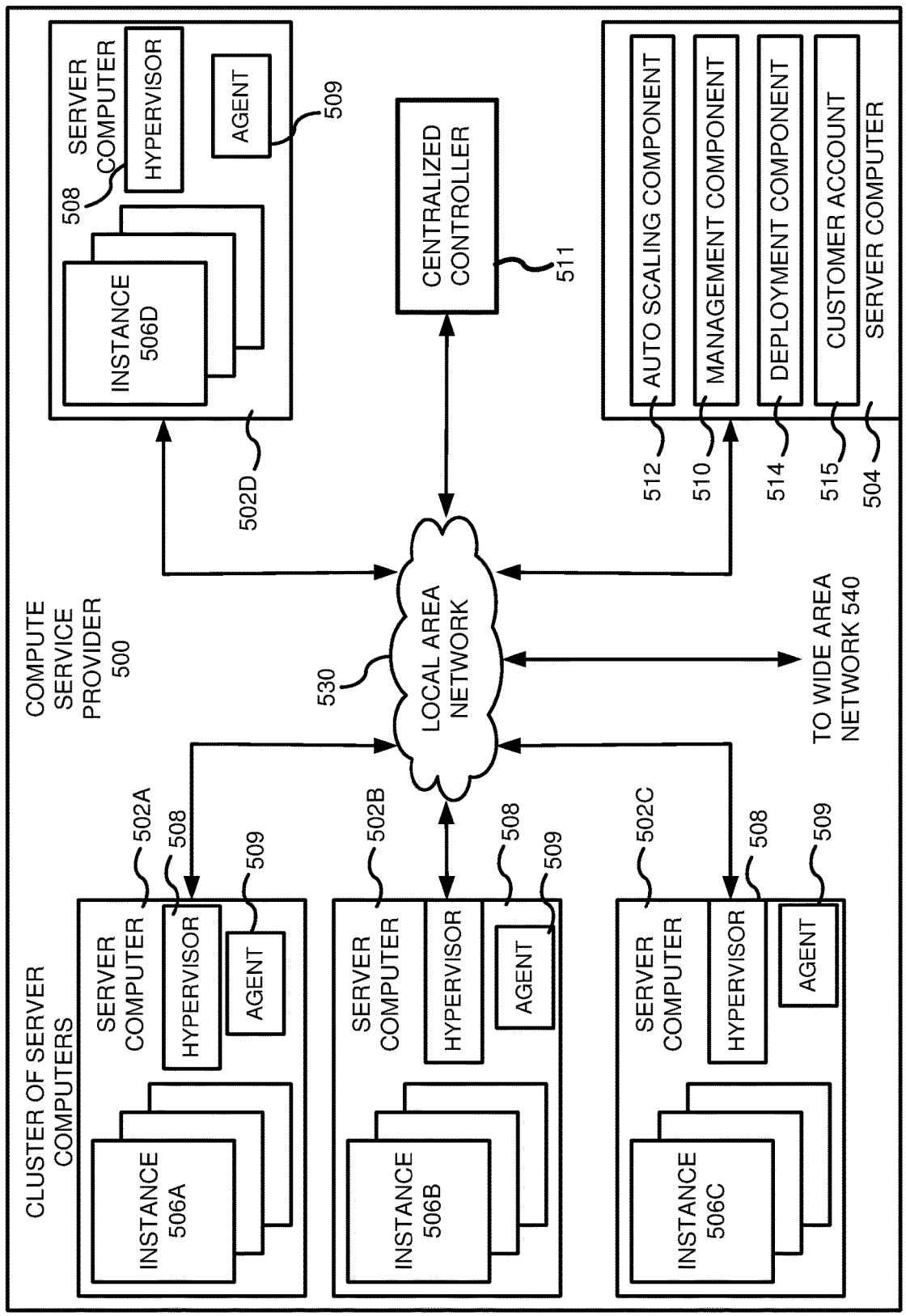
FIG. 5 is an example system diagram showing a plurality of virtual machine instances running in the multi-tenant environment with a centralized controller.

As described above, the disclosed update system may be implemented in a cloud computing or other distributed computing environment in some examples. FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. A particular application that can execute on one or more instances 506 or run on the hypervisor, is an agent 509. The agent 509 can receive test packets and transmit latency information or other network data to the centralized controller 511. The latency information can include a packet identifier as well as timing information so that latency of each packet can be determined by the centralized controller 511. The agent 509 can also transmit packets for receipt by other agents on the network in order to assist the centralized controller in latency, capacity/bandwidth, or other network operating status determinations. In one embodiment, the agent 509 can transmit a test packet upon request from the centralized controller 511 and report back to the centralized controller a time that the packet was transmitted together with an identifier of the packet.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Figure 6:
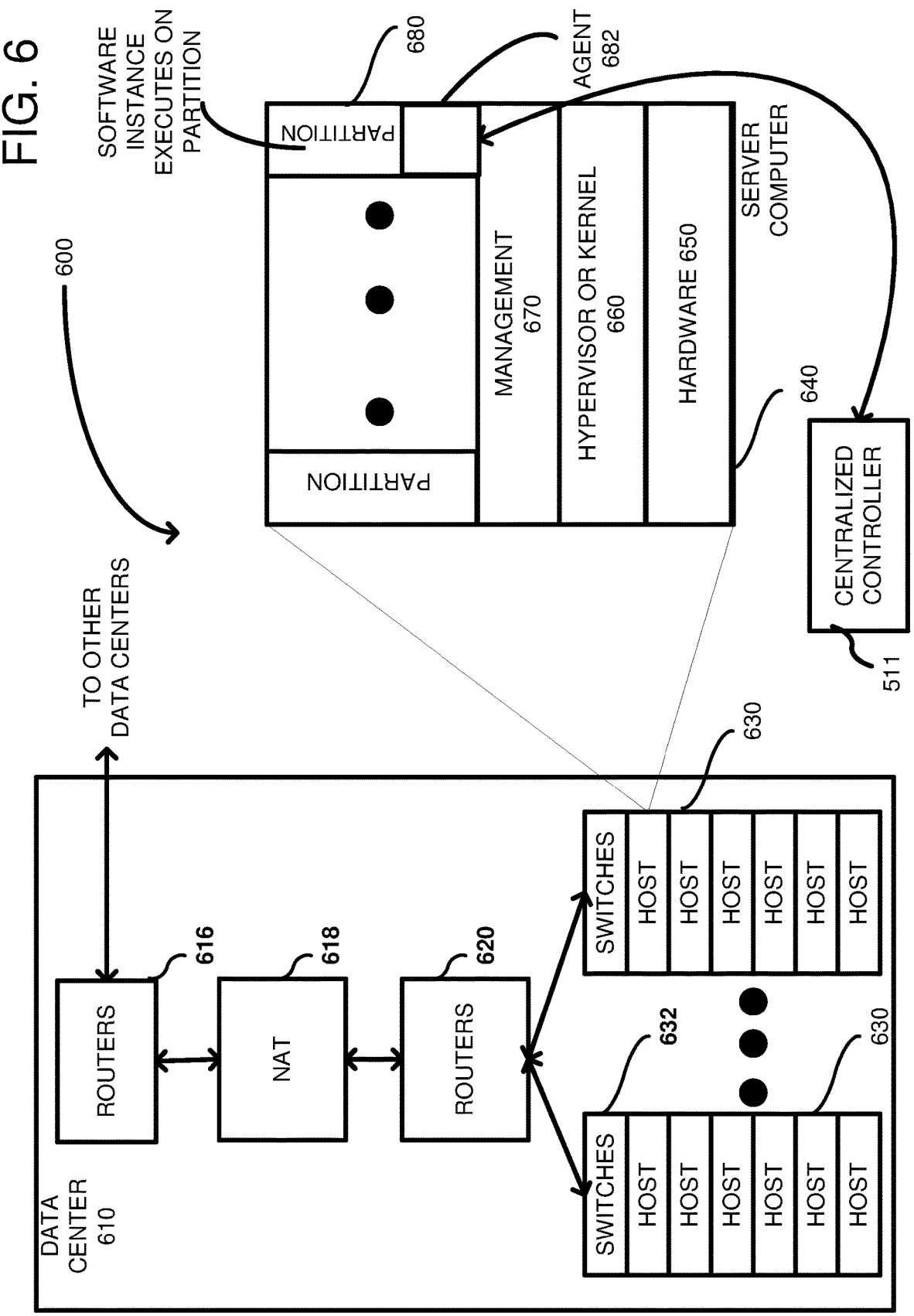
FIG. 6 shows an example of a plurality of host computers, routers and switches, which are hardware assets used for running virtual machine instances.

FIG. 6 illustrates a network of partitions 600 and the physical hardware associated therewith. The network of partitions 600 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 670, which can then pass the metrics to the centralized controller 511. Additionally, the management layer 670 can pass to the centralized controller 511, the number of instances that are running, when they were launched, the operating system being used, the applications being run, when packets are received or transmitted (latency information), bandwidth/capacity data, etc. All such metrics can be used for consumption by the centralized controller 511 and stored in a database. Additionally, an agent 682 can execute on the partitions 680 and transmit latency and other network information to the centralized controller 511. For example, test packets can be transmitted through the network and when received by the agent 682, the agent 682 transmits the packet identifier and a timestamp of when the packet was received to the centralized controller 511. Additionally, the centralized controller 511 can inject packets into the network by passing packets to the agent 682, which can, in turn, re-transmit the packet through the network.

Figure 7:
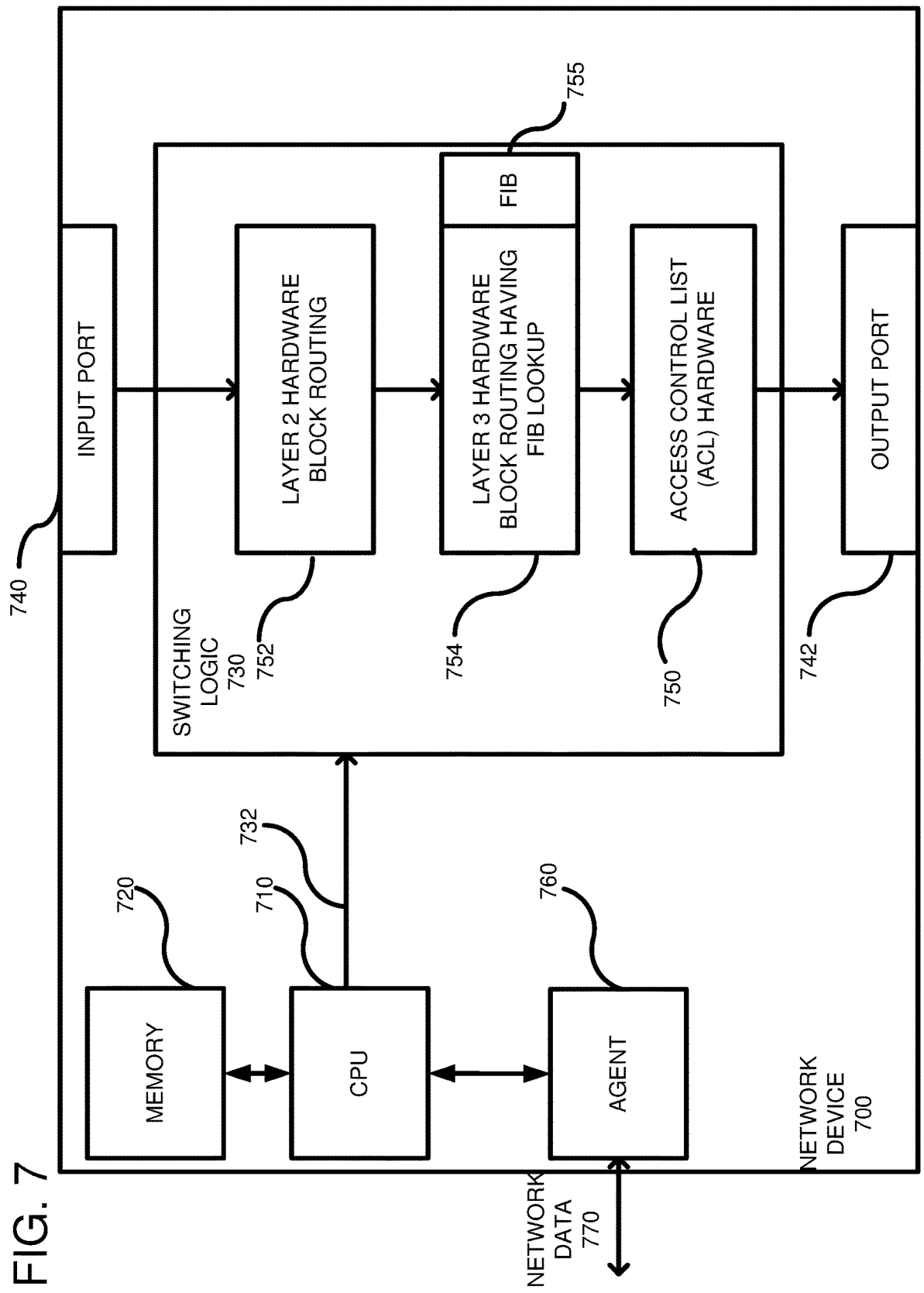
FIG. 7 is an embodiment of a router having an agent located thereon for transmitting latency data.

FIG. 7 shows a detailed example of an embodiment of the network device 700. Network device 700 is a switch that routes packets to a next hop in the network using a destination IP address. The network device 700 is an example of any of the network devices shown in FIGS. 1 and 2. A CPU 710 is coupled to a memory 720 and to switching logic 730 through a bus 732 (PCIe or other protocols and bus types can be used). The switching logic 730 is positioned between an input port 740 and an output port 742, which are typically adapted to receive network cables, such as Ethernet cables. Although only one input port 740 and one output port 742 are shown, typically there are multiple ports (also called interfaces) on a network device. The switching logic 730 can be a single ASIC integrated circuit or divided into multiple integrated circuits. The switching logic 730 can include multiple different hardware logic blocks including a layer 2 hardware block 752, a layer 3 hardware block 754, and an Access Control List (ACL) hardware block 750. The layer 2 hardware block 752 relates to an Ethernet layer and can forward packets based on MAC tables. The layer 2 lookup ensures that an incoming packet's MAC address equals the MAC address of the network device 700. If so, then the packet can proceed onto the layer 3 hardware. If not, then the layer 3 lookup does not occur. The layer 3 hardware block 754 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 755, which includes destination addresses (e.g., prefixes) for packets being transmitted through the switching logic and associated ports for forwarding the packets. The network device 700 can run routing protocols, such as an Open Shortest Path First (OSPF) or a Routing Information Protocol (RIP), to communicate with other Layer 3 switches or routers. The routing tables are used to lookup the route for an incoming packet. The ACL block 750 relates to permissions and can include rules whether to drop packets. The different hardware blocks can be coupled in series and additional hardware blocks can be added based on the design. Packets pass from the input port 740 to the output port in accordance with the configuration of the hardware logic blocks 750, 752, 754. The input port 740, output port 742 and switching logic 730 can be considered a data plane or forwarding plane of the network device 700. By contrast, the CPU 710, memory 720, and an agent 760 are considered part of a control plane.

As shown, the agent 760 can execute on the CPU 710 and can be used to transmit latency, capacity, or other network data to the centralized controller 511 (FIG. 5), as indicated at 770. The switching logic 730 can intercept a test packet and transmit the packet to the agent 760 for processing. The agent 760 can determine a timestamp to store with the packet and transmit the packet identifier together with the timestamp to the centralized controller 511.

Figure 8:
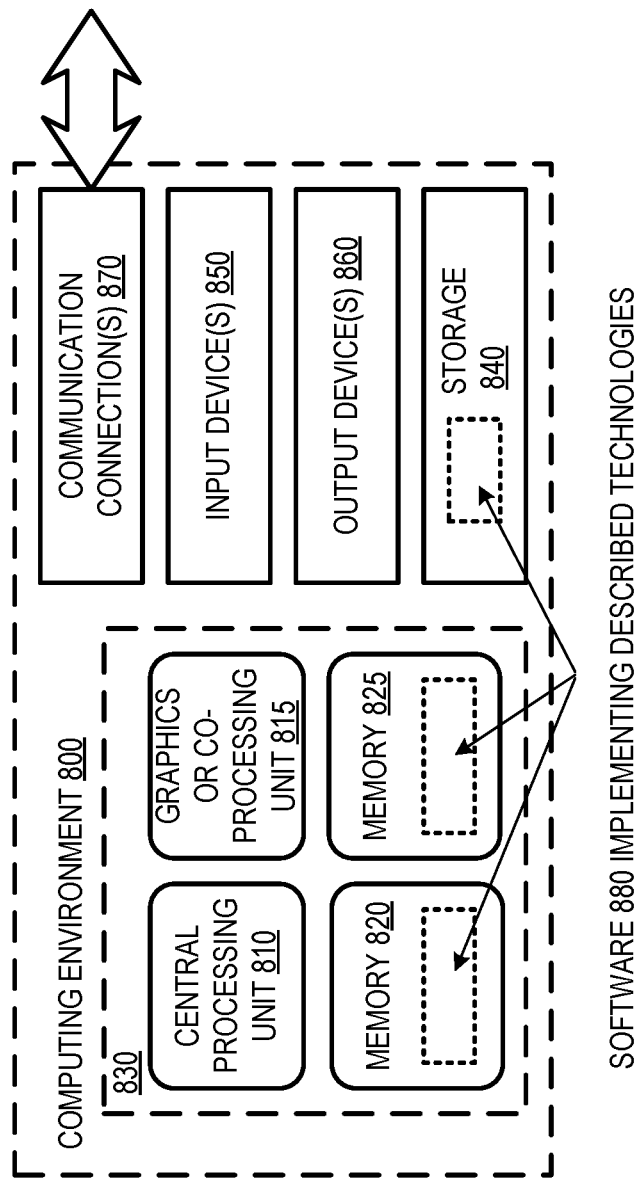
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.) included in any of a variety of computing environments (e.g., cloud computing environments, non-cloud computing environments, or mixed computing environments).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of performing path computations in a network comprising a plurality of nodes and a plurality of communication links between the plurality of nodes, the method comprising:

receiving network data indicating a topology of the network;

identifying a plurality of regions of the network, each having a different type of mesh fabric pattern;

generating a different representation of the network for each of the plurality of regions, each representation having a synthetic link corresponding to an aggregation of a respective plurality of links in the region and having a property value corresponding to aggregated property values of the respective plurality of links, wherein for a first subset of the regions, the synthetic link is connected to at least one collapsed vertex representing a plurality of nodes in the region;

determining a respective set of k paths through each of the plurality of regions based on the respective generated representations and the respective total cost of the synthetic links;

joining the respective sets of k paths to generate k end-to-end paths between a source and a destination through the network;

selecting one of the k end-to-end paths based on a received constraint and a total cost of the k end-to-end paths; and routing data through the network based on the selected one of the k end-to-end paths.

2. The method of claim 1, wherein the respective property value of each of the synthetic links includes an aggregated latency or an aggregated capacity parameter of each link represented by the synthetic link.

3. The method of claim 1, wherein the plurality of regions includes a sparse mesh region, a Clos mesh region, and a flat mesh region.

4. The method of claim 3, wherein, for the sparse region, the respective representation is generated by collapsing all fabrics in the sparse region into a single vertex each, wherein the synthetic link for the sparse region includes a respective synthetic link extending between each vertex, each synthetic link corresponding to an aggregation of links extending between the respective collapsed fabrics, and wherein the property value of each synthetic link for the sparse region corresponds to an aggregated property value of the respective plurality of links extending between the respective collapsed fabrics.

5. The method of claim 1, wherein the determined respective sets of k paths through the plurality of regions are computed to have a length below a threshold value.

6. A method comprising:

for each region of a plurality of regions of a network, the network comprising a plurality of nodes and a plurality of communication links between the plurality of nodes:

aggregating two links or vertices in the region to form a synthetic link or vertex having a property value corresponding to respective aggregated property values of the two links or vertices, wherein the respective aggregated property values of the two links or vertices includes an aggregated latency value, an aggregated capacity value for the two links or vertices, or an aggregation of a combination of latency and capacity values for the two links or vertices, generating a representation of the region including the synthetic link or vertex, and performing path computation using the generated representation to generate a respective set of k paths selected based on a parameter and the property value of the synthetic link or vertex;

joining respective sets of k paths to form k end-to-end paths through the network from a source to a destination; and routing data through the network based on a selected one of the k end-to-end paths.

7. The method of claim 6, wherein the path computation includes a shortest path computation using a shortest path computation algorithm to compute the respective set of k paths.

8. The method of claim 7, wherein the path computation includes performing the shortest path computation for a maximum path computation time frame, and wherein the quantity of paths in the respective set of k paths is the quantity of paths computed within the maximum path computation time frame.

9. The method of claim 6, wherein the respective set of k paths include information indicating respective stitching points for the paths, and wherein joining the respective sets of k paths comprises determining, for each set of k paths based on the stitching points, options that are compatible with respective paths of a set of k paths that are upstream in an end-to-end path direction.

10. The method of claim 6, wherein the path computation is performed in a prioritized order based on a rule, the rule indicating a targeted distribution of communication demands.

11. The method of claim 6, wherein, for a Clos mesh region or a flat mesh region of the network, aggregating the two links or vertices in the region comprises computing a respective path and cost between a plurality of vertices and extracting a synthetic edge from the computed paths based on the computed cost.

12. The method of claim 6, wherein, for a sparse mesh region of the network, aggregating the two links or vertices in the region comprises removing all client device vertices and collapsing all Clos fabrics in the network into a single vertex each.

13. A system, comprising:
a model generator for aggregating, for each region of a plurality of regions of a network, two links or vertices in the region to form a respective synthetic link or vertex having a property value corresponding to aggregated property values of the two links or vertices, and generating, for each region, a respective representation of the region including the synthetic link or vertex;
a plurality of path computation units for performing path computation using the generated respective representation of the region to generate a respective set of k paths selected based on a parameter and the property values of the respective synthetic link or vertex;
a path joining unit for joining the respective sets of k paths to form k end-to-end paths through the network from a source to a destination;
a model cache configured to store the generated representations of the plurality of regions of the network or the respective sets of k paths; and
a model updater configured to trigger generation and storage of an updated representation of a selected region of the network responsive to detection of a change in the selected region of the network.

14. The system of claim 13, wherein the model generator includes a sparse mesh aggregator for aggregating two links or vertices in a sparse mesh region of the network.

15. The system of claim 13, wherein the model generator includes a Clos mesh aggregator for aggregating two links or vertices in a Clos mesh region of the network.

16. The system of claim 13, wherein the model generator includes a flat mesh aggregator for aggregating two links or vertices in a flat mesh region of the network.

17. The system of claim 13, wherein the path joining unit is further configured to provide a selected one of the k end-to-end paths to a controller for updating a forwarding table in a router or for performing demand placement in the network.

* * * * *